Sept. 29, 1959 P. KRAUSS 2,906,808
BUS BAR DISTRIBUTION SYSTEM
Filed July 22, 1958 2 Sheets-Sheet 1

INVENTOR.
PAUL KRAUSS
BY Robert T. Casey
ATTORNEY

Sept. 29, 1959   P. KRAUSS   2,906,808
BUS BAR DISTRIBUTION SYSTEM
Filed July 22, 1958   2 Sheets-Sheet 2

INVENTOR.
PAUL KRAUSS
BY Robert F. Carey
ATTORNEY ered Sept. 29, 1959

United States Patent Office 2,906,808
Patented Sept. 29, 1959

2,906,808
BUS BAR DISTRIBUTION SYSTEM

Paul Krauss, Burlington, Vt., assignor to General Electric Company, a corporation of New York Application July 22, 1958, Serial No. 750,191

4 Claims. (Cl. 174—72)

My invention relates to electric power distribution systems of the bus bar type, commonly referred to as busways, and more particularly, to connections or fittings for use therewith.

For the most efficient use of space in industrial and commercial buildings, it is desirable that the size and weight of busway systems as a whole be as small as possible. While busways in general have recently been developed of relatively small size and weight, fittings for such busways, especially those which involve the joining of two runs of multiphase power busway at right angles to each other, have not been provided of comparably small size. This is because of limitations imposed by the requirements of maintaining adequate electric insulation or clearance between conductors of different phases in such fittings and of providing a satisfactory electrical connection or joint therein between conductors of common phases. Because of these requirements, such fittings are usually substantially larger than corresponding busway cross-section, and it is not unusual for the lateral dimensions of such T or cross fittings to be three or four times the corresponding dimensions of a straight length of such busway. Such constructions result in an inefficient use of space for service facilities, and also do not present a very pleasing appearance.

Accordingly, it is an object of the present invention to provide an electric power busway having compact T and cross connections which are made without enlarging the busway housing, without appreciably increasing the electric resistance per unit length of the busway conductors, and with adequate electric insulation being provided between conductors of different phases.

It is another object of the invention to provide such a multiphase busway fitting utilizing conductors which may be readily fabricated from ordinary commercially available bus bar conductors, and with substantially no waste of material.

In accordance with my invention, I provide a busway comprising a first group of elongated bus bars supported in side-by-side spaced relation with their opposite edges in common planes respectively. A second group of elongated bus bars is disposed at approximately right angles with respect to the first group of bus bars, also arranged in side-by-side spaced relation between the two above-mentioned parallel planes. All of the bus bars, furthermore, have portions thereof deformed in cross-section so that the bars of the two groups can cross each other substantially entirely within the space defined by the two parallel planes. Suitable means is also provided for connecting selected pairs of the bars of the two groups at their cross-over points.

In carrying out my invention in one form, the bus bars are deformed to make possible their crossing over each other as set forth above by cutting out and removing a longitudinal portion of each bar substantially equal in width to one-half the width of the bar and attaching the removed piece to the remaining portion of the bar at the cutaway point, thereby achieving the desired result without complicated or expensive tooling and with substantially no waste of material.

My invention will be better understood and its various objects and advantages will be more fully appreciated from the following description taken in conjunction with the accompanying drawings in which.

Figure 1:
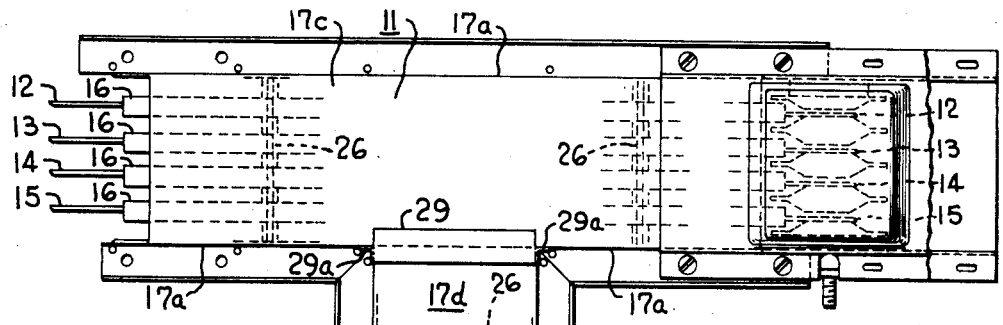
Figure 1 is a plan view of a T type busway fitting incorporating the present invention.

Referring now to Figure 1, I have shown for the purpose of illustration a T type busway fitting particularly adapted for connection to a 4-wire 3-phase alternating current electric power source rated 600 volts and 1000 amperes or less. The horizontally extending portion of the illustrated busway may be considered as constituting, in use, a portion of a "main" run of busway and the remaining portion as constituting, in use, a portion of a "branch" run. The fitting comprises a generally T shaped metal housing 11 which encloses a group of four laterally spaced main run conductors or bus bars 12, 13, 14 and 15 and a group of branch run bus bars 22, 23, 24 and 25. Each of the bus bars is individually covered by insulation 16 such, for instance, as Butyl type synthetic rubber or the like, for its entire length, and the insulated bus bars are mounted within the housing 11 by suitable insulating supports 26.

Figure 3:
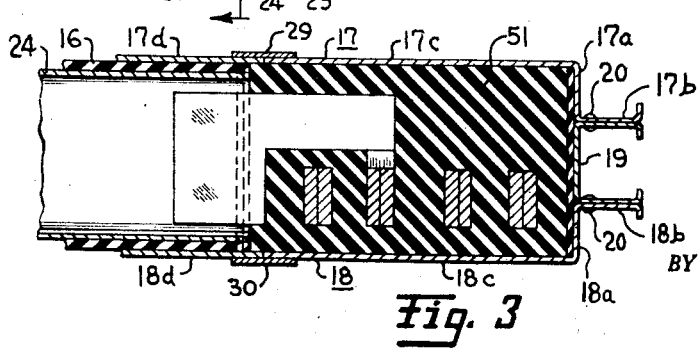
Figure 3 is a sectional view taken along line 3—3 of Figure 2.

The housing 11 in the illustrated embodiment of my invention comprises top and bottom T-shaped cover members 17 and 18, respectively of sheet metal. As can be seen most clearly in Figure 3, each of the cover members 17 and 18 includes relatively narrow depending side walls 17a and 18a provided with outwardly extending flanges 17b and 18b. The cover members 17 and 18 are rigidly connected together by channel-shaped spacer members 19 disposed between the flanges 17b and 18b of appropriate rivets 20 or the like.

Each of the T-shaped cover members 17 and 18 is formed of a main run cover section 17c, 18c and a branch run cover section 17d, 18d by splice plates 29 and 30 respectively. Each of the splice plates 29 and 30 has portions overlapping the main planar portions of the cover sections and also angular shaped depending side portions 29a and 30a (30a not shown) overlapping adjacent portions of the side wall portions 17a and 18a respectively.

Figure 4:
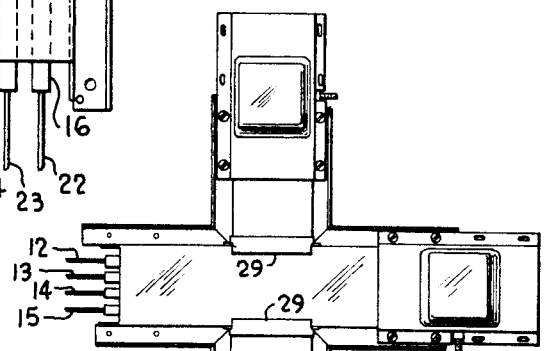
Figure 4 is a top plan view of a "cross" type busway fitting incorporating the present invention.

In Figure 4, the invention is shown as embodied in a "cross" busway fitting. The construction of this fitting is similar to that of the T of Figure 1 except that a second branch section 52 is provided, having bus bar terminations 22a, 23a, 24a and 25a.

Figure 2:
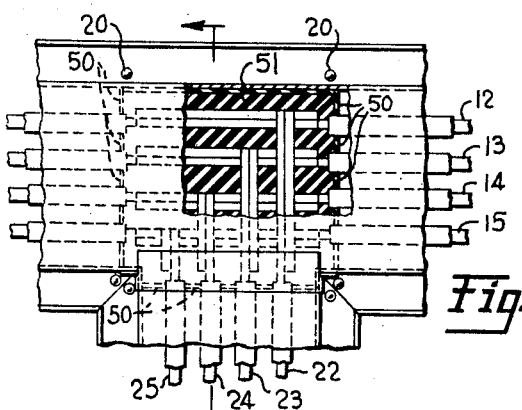
Figure 2 is a top plan view of a portion of the fitting of Figure 1, with portions broken away.

In accordance with my invention, the bars 22—25 are physically and electrically connected to the bars 12—15 respectively, within the confines of housing 11 without the necessity of enlarging the busway housing for the purpose of this connection. In order to accomplish this result, the respective bus bars are deformed in a particular manner to be described. Due to the orientation and arrangement of the bus bars, as shown in Figure 2, the feeder bus bar 22 must cross over the main bus bars 13, 14 and 15 for connection to bar 12. In making this connection, adequate electrical clearance must be maintained between bar 22 and the bars 13—15 of different phases over which it crosses, and the joint between the respective bars 22 and 12 must be of relatively low electrical resistance.

Figure 5:
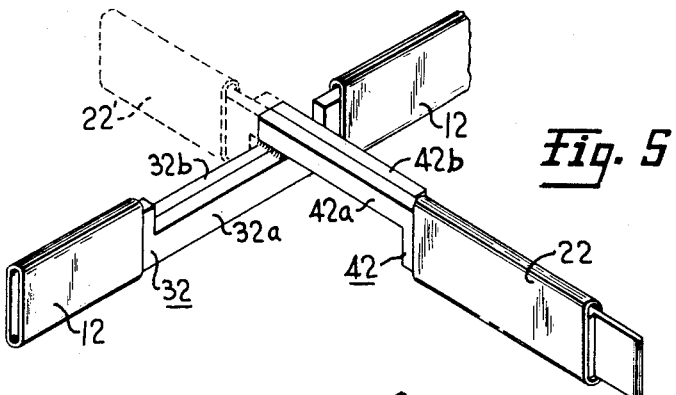
Figure 5 is a perspective view of two of the T-connected bus bars of the fitting shown in Figures 1 and 2.

As indicated in Figure 5, the bus bars 12 and 22, shown with insulation coating 16 omitted, comprise hollow tubular conductors having oblong cross-sections. Adapter bars 32 and 42, are provided, comprising solid bars of generally rectangular cross-section. The bar 32 has the end portions thereof constructed with appropriate cross-sectional dimensions for close-fitting insertion into the axially aligned spaced portions of the hollow bus bar 12. The bar 32 is welded or brazed to bar 12 at such points and forms an integral unit therewith.

The bar 32 is also provided with a portion 32a intermediate the ends thereof which portion has a width dimension one-half the width dimension of the end portions, and a thickness dimension twice the thickness of the end portions.

The bus bar 22 is similarly provided with an adapter bar 42 having an end portion closely fitted with the end of the bar 42 and welded or brazed thereto. The adapter 42 also is provided with a portion 42a of reduced width and increased thickness, similar to portion 32a of adapter 32.

In the preferred embodiment of the invention, the deformation of the bars 32 and 42 is accomplished by removing rectangular slugs 32b and 42b from longitudinal portions of elongated metal stock of substantially uniform cross-section by cutting or punching of the like. The respective punched-out slugs 32b and 42b are then fastened to the remaining portion of the original material by rivets and brazing or other suitable means in order to provide the desired additional width of the adapter bars. This particular method for obtaining the prerequisite deformation is preferred because of its simplicity and economy.

Figure 7:
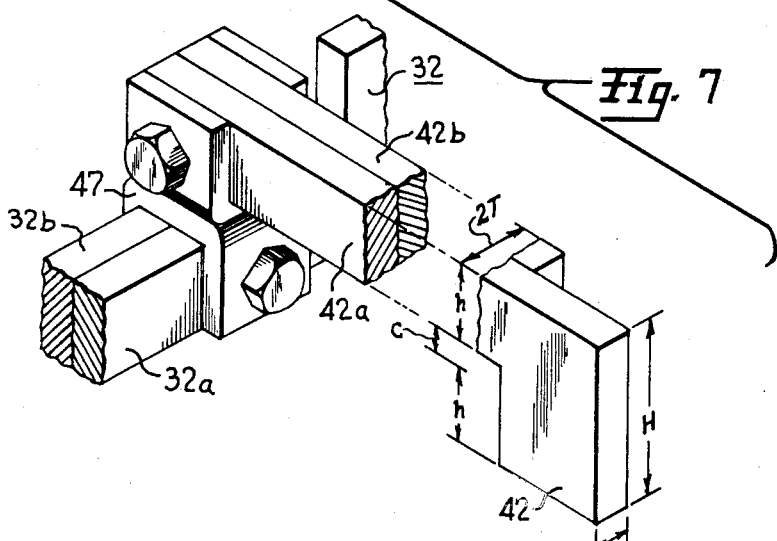
Figure 7 is an enlarged perspective view, partially in section, of an alternative means for joining the two T-connected bus bars of Figure 4.

The actual connection between the bars 32 and 42 may be made, for example, by means of welding or brazing the intermediate portions 32a and 42a together at their cross-over point as shown in Figure 5. In another embodiment of the invention, shown in Figure 7, the portions 32a and 42a are connected by means of a coupler 47. The coupler 47 comprises two channel sections connected back-to-back with the legs of one channel being oriented in planes perpendicular to the planes of the legs of the other. In order that space be provided in this embodiment between the intermediate portions 32a and 42a, these portions are preferably made of a height $h$ less than one-half the height $H$ of the end portions, thereby leaving a space C therebetween. In either case, the area of the respective adapted bars 32 and 42 at their junction is sufficiently great to provide a relatively low resistance path for current flow, thereby ensuring that the rate of heat generation at this critical point does not exceed acceptable limits.

Figure 6:
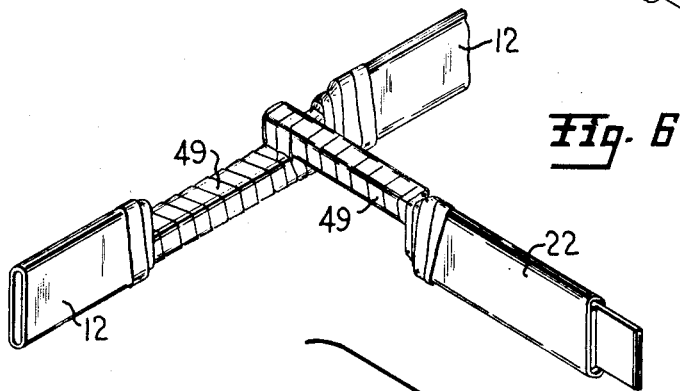
Figure 6 is a perspective view similar to Figure 5 illustrating an alternative method for insulating the respective bus bars.

Insulation may be provided for the bus bar assembly as shown in Figure 6 by wrapping them with insulating tape 49. In the embodiment of the invention illustrated in Figures 1 and 2, the necessary insulation is furnished by providing the housing 11 with suitable barriers 50 to isolate the portion of the fitting within the housing 11 which contains the crossover and interconnection, and by filling this area with suitable insulating material 51.

With the particular bus bar construction and arrangement described in detail above, the feeder bars of the busway cross over the intermediate portions of the main bars substantially entirely within the space defined by the parallel planes which include the opposite edges of the end portions of the respective adapter bars, and each feeder bar does not touch any main bar except the one to which it is directly connected. Thus the interconnection between the main run and the feeder section of the busway is made without enlarging the busway housing. The illustrated arrangement can be easily adapted for either a cross or a T-type of connection. For the purpose of a cross fitting, the adapter bars associated with bus bars 22—25 would be made identical to the adapter bars 12—15, as is clearly shown by broken lines 22' in Figure 5.

While I have shown and described a preferred form of my invention by way of illustration, many modifications will occur to those skilled in the art. Therefore, I contemplate by the appended claims to cover all such modifications as fall within the true spirit and scope of my invention.

What I claim as new and desire to secure by Letters Patent of the United States is:

1. A T-type busway fitting comprising a generally T-shaped housing having a horizontally extending head portion and a vertically extending stem portion, a first group of generally parallel elongated bus bars supported in insulated relation in said head portion and having the end portions thereof exposed for contact and in alignment at each end of said head portion for connection to a main run of busway, a second group of elongated parallel bus bars supported in insulated relation in said stem portion of said housing and having end portions thereof projecting and exposed for contact at the end portion of said stem portion of said housing, said housing comprising generally T-shaped top and bottom cover members of sheet metal, said bus bars having a predetermined thickness and having a height substantially greater than said thickness and extending substantially completely between said top and bottom cover members throughout the major intermediate portions thereof, said bus bars of said first group having a plurality of longitudinally extending transversely aligned notches cut therein from the bottom edges thereof substantially one-half the height of said bus bars, said second group of bus bars having a plurality of longitudinally extending transversely aligned notches cut therein from the top edges thereof substantially one-half the height of said bus bars, supplementary conductor means rigidly attached to said reduced height portions of each of said bars to restore the cross-sectional area thereof substantially to that of said original cross-section, said reduced height portions of said first group of bus bars extending across said reduced height portions of said second group of bus bars, means connecting selected pairs of said reduced height portions of said bus bars together, insulating barrier means between the cross-over portions of said bus bars and each of said end portions of said T-shaped housing, and homogeneous insulating material substantially completely filling said housing within the space defined by said top and bottom covers and said barriers.

2. A T-type busway fitting comprising a generally T-shaped housing having a horizontally extending head portion and a vertically extending stem portion, a first group of generally parallel elongated bus bars supported in insulated relation in said head portion and having the end portions thereof exposed for contact and in alignment at each end of said head portion for connection to a main run of busway, a second group of elongated parallel bus bars supported in insulated relation in said stem portion of said housing and having end portions thereof projecting and exposed for contact at the end portion of said stem portion of said housing, said housing comprising generally T-shaped top and bottom cover members of sheet metal, said bus bars having a predetermined thickness and having a height substantially greater than said thickness and extending substantially completely between said top and bottom cover members throughout the major intermediate portions thereof, said bus bars of said first group having a plurality of longitudinally extending transversely aligned notches cut therein from the bottom edges thereof substantially one-half the height of said bus bars, said second group of bus bars having a plurality of longitudinally extending transversely aligned notches cut therein from the top edges thereof substantially one-half the height of said bus bars, supplementary conductor means rigidly attached to said reduced height portions of each of said bars to restore the cross-sectional area thereof substantially to that of said original cross-section, said reduced height portions of said first group of bus bars extending across said reduced height portions of said second group of bus bars, means connecting selected pairs of said reduced height portions of said bus bars together, comprising a pair of generally channel-shaped clamping portions disposed in back-to-back relation and having the side wall portions thereof extending at right angles to each other and clamping means for clamping each of said reduced portions of said bus bars within one of said channel-shaped clamping members.

3. A busway fitting comprising a housing having a horizontally extending portion and a vertically extending portion, a first group of generally parallel elongated bus bars supported in insulated relation in said horizontally extending portion and having the end portions thereof exposed for contact and in alignment at each end of said horizontally extending portion for conection to a run of busway, a second group of elongated parallel bus bars supported in insulated relation in said vertically extending portion of said housing and having end portions thereof projecting and exposed for contact at an end portion of said vertically extending portion of said housing, said housing comprising top and bottom cover members of sheet metal, said bus bars having a predetermined thickness and having a height substantially greater than said thickness and extending substantially completely between said top and bottom cover members throughout the major intermediate portions thereof, said bus bars of said first group having a plurality of longitudinally extending transversely aligned notches cut therein from the bottom edges thereof substantially one-half the height of said bus bars, said second group of bus bars having a plurality of longitudinally extending transversely aligned notches cut therein from the top edges thereof substantially one-half the height of said bus bars, supplementary conductor means rigidly attached to said reduced height portions of each of said bars to restore the cross-sectional area thereof substantially to that of said original cross-section, said reduced height portions of said first group of bus bars extending across said reduced height portions of said second group of bus bars, means connecting selected pairs of said reduced height portions of said bus bars together, insulating barrier means between the cross-over portions of said bus bars and each of said end portions of said housing, and homogeneous insulating material substantially completely filling said housing within the space defined by said top and bottom covers and said barriers.

4. A busway fitting comprising a housing having a horizontally extending portion and a vertically extending portion, a first group of generally parallel elongated bus bars supported in insulated relation in said horizontally extending portion and having the end portions thereof exposed for contact and in alignment at each end of said horizontally extending portion for connection to a run of busway, a second group of elongated parallel bus bars supported in insulated relation in said vertically extending portion of said housing and having end portions thereof projecting and exposed for contact at an end portion of said vertically extending portion of said housing, said housing comprising top and bottom cover members of sheet metal, said bus bars having a predetermined thickness and having a height substantially greater than said thickness and extending substantially completely between said top and bottom cover members throughout the major intermediate portions thereof, said bus bars of said first group having a plurality of longitudinally extending transversely aligned notches cut therein from the bottom edges thereof substantially one-half the height of said bus bars, said second group of bus bars having a plurality of longitudinally extending transversely aligned notches cut therein from the top edges thereof substantially one-half the height of said bus bars, supplementary conductor means rigidly attached to said reduced height portions of each of said bars to restore the cross-sectional area thereof substantially to that of said original cross-section, said reduced height portions of said first group of bus bars extending across said reduced height portions of said second group of bus bars, means connecting selected pairs of said reduced height portions of said bus bars together, comprising a pair of generally channel-shaped clamping portions disposed in back-to-back relation and having side wall portions thereof extending at right angles to each other and clamping means for clamping each of said reduced portions of said bus bars within one of said channel-shaped clamping members.

References Cited in the file of this patent

UNITED STATES PATENTS

| | | |
|---|---|---|
| 502,083 | McEvoy | July 25, 1893 |
| 2,297,170 | Rudd | Sept. 29, 1942 |
| 2,824,901 | Reichert et al. | Feb. 25, 1958 |